(12) United States Patent
Craske (10) Patent No.: US 9,632,776 B2
(45) Date of Patent: Apr. 25, 2017

(54) PRELOAD INSTRUCTION CONTROL

(75) Inventor: Simon John Craske, Cambridge (GB)

(73) Assignee: ARM Limited, Cambridge (GB)

( * ) Notice: Subject to any disclaimer, the term of this patent is extended or adjusted under 35 U.S.C. 154(b) by 1199 days.

(21) Appl. No.: 13/064,113

(22) Filed: Mar. 7, 2011

(65) Prior Publication Data

US 2011/0264887 A1 Oct. 27, 2011

(30) Foreign Application Priority Data

Apr. 22, 2010 (GB) .................................. 1006758.5

(51) Int. Cl.
| | | |
|---|---|---|
| *G06F 12/08* | (2016.01) | |
| *G06F 9/30* | (2006.01) | |
| *G06F 12/0862* | (2016.01) | |
| *G06F 9/38* | (2006.01) | |

(52) U.S. Cl.
CPC .......... *G06F 9/30043* (2013.01); *G06F 9/383* (2013.01); *G06F 9/3859* (2013.01); *G06F 12/0862* (2013.01); *G06F 2212/6028* (2013.01); *Y02B 60/1225* (2013.01)

(58) Field of Classification Search
None
See application file for complete search history.

(56) References Cited

U.S. PATENT DOCUMENTS

| 6,571,318 | B1 * | 5/2003 | Sander et al. ................ 711/137 |
| 2002/0144054 | A1 * | 10/2002 | Fanning et al. ............. 711/108 |
| 2003/0204673 | A1 | 10/2003 | Venkumahanti et al. |
| 2006/0149904 | A1 | 7/2006 | Mowry |
| 2007/0043909 | A1 | 2/2007 | Diefendorff |
| 2007/0136534 | A1 * | 6/2007 | Mesard et al. ................ 711/137 |
| 2007/0283123 | A1 * | 12/2007 | Vick et al. .................... 711/207 |
| 2009/0187715 | A1 | 7/2009 | Sajayan et al. |
| 2010/0250853 | A1 * | 9/2010 | Krieger et al. ............... 711/122 |

FOREIGN PATENT DOCUMENTS

| CN | 1806225 | 7/2006 |
| EP | 1 139 222 | 10/2001 |
| JP | S62-47746 | 3/1987 |
| JP | H02-178859 | 7/1990 |

(Continued)

OTHER PUBLICATIONS

UK Search Report for GB Application No. 1006758.5, dated Aug. 10, 2010.

(Continued)

*Primary Examiner* — Tuan Thai
*Assistant Examiner* — Gautam Sain
(74) *Attorney, Agent, or Firm* — Nixon & Vanderhye P.C.

(57) ABSTRACT

A processor provided with an instruction decoder responsive to preload instructions which trigger preload operations, such as page table walks and cache line fetches. An instruction decoder identifies if the memory address associated with the preload instruction matches a null value and suppresses the preload operation if the memory address does match the null value. The null value may be set under program control, it may be predetermined as a fixed value (e.g. zero) or may be set under hardware control, such as corresponding to memory addresses of a page identified by a memory management unit as non-accessible.

19 Claims, 5 Drawing Sheets

(56) References Cited

FOREIGN PATENT DOCUMENTS

| JP | 7-271673 | 10/1995 |
|---|---|---|
| JP | H08-249228 | 9/1996 |
| JP | H08-292886 | 11/1996 |
| JP | 2000-148584 | 5/2000 |
| JP | 2001-142780 | 5/2001 |
| JP | 2001-147857 | 5/2001 |
| JP | 2001-202287 | 7/2001 |
| JP | 2003-58421 | 2/2003 |

OTHER PUBLICATIONS

Chinese Third Office Action dated Dec. 9, 2015 issued in CN 201110100835.0 and English translation, 8 pages.
First Office Action issued Sep. 17, 2014 in CN 201110100835.0 and English translation, 31 pages.
First Office Action issued in corresponding Japanese Patent Application No. 2011-069731, drafted Apr. 15, 2014, mailed Apr. 21, 2014, with English Translation (20 pgs).
Chinese Second Office Action dated Jun. 4, 2015 in CN 201110100835.0 and English translation, 30 pages.
UK Examination Report issued Feb. 20, 2017 in GB 1006758.5, 5 pages.

* cited by examiner

PRELOAD INSTRUCTION CONTROL

This application claims priority to GB Application No. 1006758.5 filed 22 Apr. 2010, the entire contents of which is hereby incorporated by reference.

TECHNOLOGY OVERVIEW

This invention relates to the field of data processing systems. More particularly, this invention relates to data processing systems which support preload instructions for triggering preload operations for preparing for a subsequent memory access.

BACKGROUND

It is known to provide data processing systems which support preload instructions. Such preload instructions specify a memory address that is to be subject to a preload operation to prepare for a subsequent memory access to that memory address. The data at that memory address is at least likely to be accessed later and accordingly a preload operation to prepare for that subsequent access can speed up the later access. However, the preload operations consume energy to perform and may in some circumstances slow other data processing operations which it is desired to perform, e.g. a preload operation triggering a fetch may get in the way of a later load operation that immediately requires its fetched data value.

Measures which can reduce energy consumption and improve the efficiency of execution are advantageous.

SUMMARY

Viewed from one aspect the present invention provides an apparatus for processing data comprising:

processing circuitry configured to perform data processing operations in response to program instructions;

instruction decoder circuitry coupled to said processing circuitry and responsive to said program instructions to generate control signals for controlling said processing circuitry to perform said data processing operations; wherein said instruction decoder is responsive to a preload instruction, said preload instruction specifying a memory address location to be subject to a preload operation for preparing for a subsequent memory access to said memory address, to compare said memory address with a null value and:

(i) if said memory address does not match said null value then to generate control signals for controlling said processing circuitry to perform said preload operation; and (ii) if said memory address does match said null value then not to generate said control signals for controlling said processing circuitry to perform said preload operation.

The present technique recognises that for certain memory addresses it may be desirable to suppress a preload operation when a preload instruction is executed seeking to preload that memory address. As an example, it may be known that certain memory addresses correspond to data accesses which will not be performed and which are not actually required. Accordingly, a preload instruction seeking to preload data values corresponding to those memory addresses would result in wasted energy and could obstruct other more useful instructions being performed. These memory addresses may be considered as null values and the instruction decoder may compare the memory address of a received preload instruction with these null values to determine whether or not the preload operation is actually to be performed. If the memory address matches a null value, then the preload operation will not be performed. This saves energy and increases efficiency.

It will be appreciated that the preload operations could take a wide variety of different forms. In some systems translation lookaside buffer circuitry stores address mapping data specifying translations between virtual addresses and physical addresses. A preload operation in this context may trigger loading of address mapping data for the memory address to the translation lookaside buffer if the address mapping data for that memory address is not already stored within the translation lookaside buffer. Thus, when the actual load operation is required, the address translation data will already be present in the translation lookaside buffer and accordingly the load operation may proceed more rapidly.

The loading of the translation data into the translation lookaside buffer may use a page table walk operation. Such page table walks are an efficient way of storing memory address translation data, but suffer from the disadvantage of being relatively slow. Accordingly, a preload instruction to a memory address which serves to trigger the storing of the translation data for that memory address using a page table walk operation will save a considerable amount of time when the actual access operation to that memory address is performed.

In other embodiments a cache memory may be provided and the preload operation may load the data from the memory address to the cache memory. This loaded data will then be available more rapidly when an access is required to the memory address.

The null value may be set to a fixed value, such as zero. The zero memory address normally corresponds to the lowest page in the memory address space which is conventionally set to be non-accessible by many operating systems as a way of trapping erroneous operation. A memory address pointer value being zero is also a common way of signifying the end of a linked list sequence of data accesses with the last block of data having the pointer to the next block of data filled with a null value of zero to indicate it is the last block of data.

The null value may also be any one of a range of values, e.g. any memory address within a range of memory addresses will be treated as matching the null value.

It is also possible that the null value may be a programmable value set under software or hardware control to a value known to the user or system as being indicative of a preload operation not actually be required. This technique may be used, for example, if another predetermined value is used as indicating the last block of data within a linked list data structure.

The null value may be programmed under hardware control by detecting circuitry configured to detect memory addresses that are not to be subject to the preload operation. Such memory addresses, for example, may be identified by previous memory accesses returning a result that the memory address is non-accessible. Subsequent attempts to preload a non-accessible memory address are futile and accordingly such preload operations may be suppressed.

Viewed from another aspect the present invention provides an apparatus for processing data comprising:

processing means for performing data processing operations in response to program instructions;

instruction decoder means for generating control signals in response to said program instructions, said control signals controlling said processing circuitry to perform said data processing operations; wherein said instruction decoder means is responsive to a preload instruction, said preload instruction specifying a memory address location to be subject to a preload operation for preparing for a subsequent memory access to said memory address, to compare said memory address with a null value and:

(i) if said memory address does not match said null value then to generate control signals for controlling said processing circuitry to perform said preload operation; and (ii) if said memory address does match said null value then not to generate said control signals for controlling said processing circuitry to perform said preload operation.

Viewed from a further aspect the present invention provides a method of processing data comprising the steps of:

performing data processing operations in response to program instructions;

decoding program instructions to generate control signals for controlling said data processing operations; wherein said decoding is responsive to a preload instruction, said preload instruction specifying a memory address location to be subject to a preload operation for preparing for a subsequent memory access to said memory address, to compare said memory address with a null value and:

(i) if said memory address does not match said null value then to generate control signals for controlling said processing circuitry to perform said preload operation; and (ii) if said memory address does match said null value then not to generate said control signals for controlling said processing circuitry to perform said preload operation.

BRIEF DESCRIPTION OF THE DRAWINGS

The above, and other objects, features and advantages of this invention will be apparent from the following detailed description of illustrative embodiments which is to be read in connection with the accompanying drawings.

DESCRIPTION OF NON-LIMITING EXAMPLE EMBODIMENTS

Figure 1:
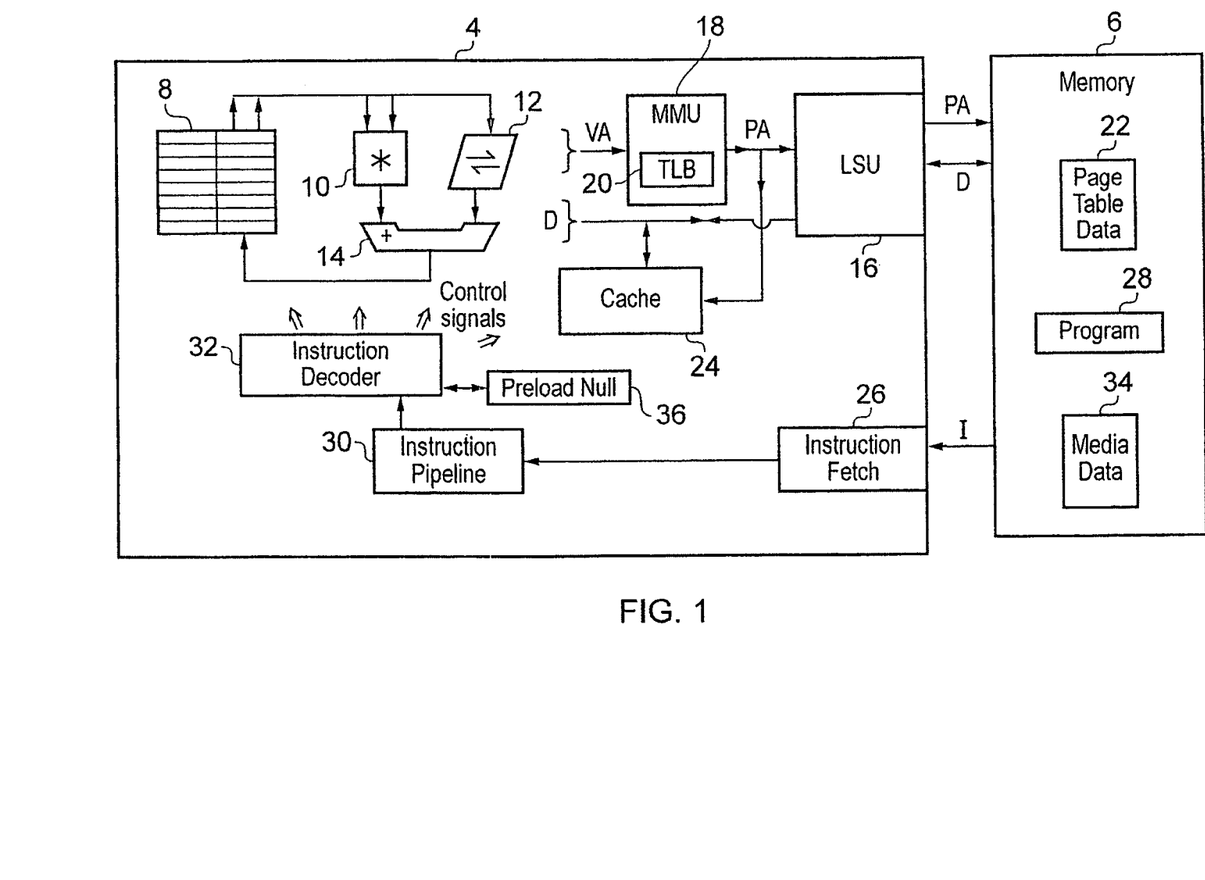
FIG. 1 schematically illustrates a data processing system including support for preload instructions.

FIG. 1 illustrates a data processing system 2 including a processor 4 coupled to a memory 6. The processor 4 includes processing circuitry having a variety of different forms. A data path comprising a register bank 8, a multiplier 10, a shifter 12 and an adder 14 performs data processing operations, such as arithmetic operations. A load/store unit 16 performs load and store operations to access data stored within the memory 6.

The processor 4 includes a memory management unit 18 incorporating a translation lookaside buffer 20. The memory management unit 18 receives a virtual address of a memory location to be accessed and converts this into a physical address as well as checking for the relevant access permissions. The translation lookaside buffer 20 serves to store a cache of address mapping data which maps virtual addresses to physical addresses as well as storing the access parameters associated with those physical addresses. The address mapping data stored within the translation lookaside buffer 20 is derived from page table data 22 stored within the memory 6 defining the full set of address mapping data for the whole of the memory address space as well as the access properties for the whole of the memory address space. A cache memory 24 stores data values within the processor 4 such that they may be more rapidly accessed than data values stored within the memory 6. The cache 24 is physically addressed and accordingly downstream of the virtual address to physical address translation performed by the memory management unit 18 using the translation lookaside buffer 20 (or page table data retrieved from the memory 6).

An instruction fetch unit 26 serves to fetch program instructions from a program 28 stored within the memory 6. These fetched instructions are supplied to an instruction pipeline 30 where they progress along instruction pipeline stages (e.g. reorder, issue etc) until they reach a decode stage at which the program instructions are applied to an instruction decoder 32. The instruction decoder 32 decodes the program instructions and generates control signals which are supplied to the other parts of the processor 4 and serve to configure and control those other parts of the processor 4 to perform the data processing operation specified in the program instruction being decoded. The program instructions may include load and store instructions performed by the load/store unit 16 to access data values such as media data values 34 stored within a memory 6. The program instructions may include arithmetic instructions to manipulate those access data values, e.g. add, multiply etc.

One type of instruction supported by the instruction decoder 32 is a preload instruction (PLD[$r_0$]). This preload instruction serves to perform a preload operation upon the memory address specified by the value held within the register $r_0$. The preload operation may take a variety of different forms. The preload operation could be to trigger the load store unit 16 to preload to the cache memory 24 the cache line containing the data value specified by the memory address in the register $r_0$. Another form of preload operation may be to trigger the memory management unit 18 to perform a page table walk through the page table data 22 if the translation lookaside buffer 20 does not already include the translation data necessary to translate the virtual address specified by the value in the register $r_0$ to a physical address value. The page table walk operations are relatively slow and accordingly triggering the memory management unit 18 to perform this page table walk ahead of the data value actually being required ensures that the translation data will be available in the translation lookaside buffer 20 before it is actually required thereby reducing the subsequent access instruction latency.

The instruction decoder 32 is coupled to a preload null register 36 storing a null value which is used interpreted by the instruction decoder 32 when decoding preload instructions to indicate null values of the memory address for which that the preload operation should not be performed. In this example embodiment, the preload null register 36 is programmable under software control. However, it is also possible, that the preload null register 36 may store a fixed predetermined value, such as zero, or may be set under hardware control as will be described later. It is also possible that the null value may be any one of a range of values, e.g.

a memory address within the range (which can be programmable) is taken as matching the null value.

Embodiments in which the null value corresponds to a range of memory addresses may be useful in circumstances such as:

MOV r0, #0x1000
PLD [r0]

for the translation lookaside buffer case, will load a mapping that corresponds not only to 0x1000, but also the 4 kB page that follows, thus a subsequent:

PLD [r0,#0x4]

can be discarded with no performance impact (and potentially some performance gain). This is also useful for hardware that performs a cache line fill, as the cache line length is not architecturally invariant, therefore code may be written such that the stride used for subsequent PLDs is the lowest common denominator of cache line length present on all chips that the code may be executed on, and whereby implementations with longer cache line lengths may choose to dispose of effectively repeated PLDs (those hitting the same cache line). An additional mechanism to timeout the entry may also be implemented so as to prevent identical preloads executed a long while apart (such that the item may have become evicted), with an alternative being to snoop evictions.

Figure 2:
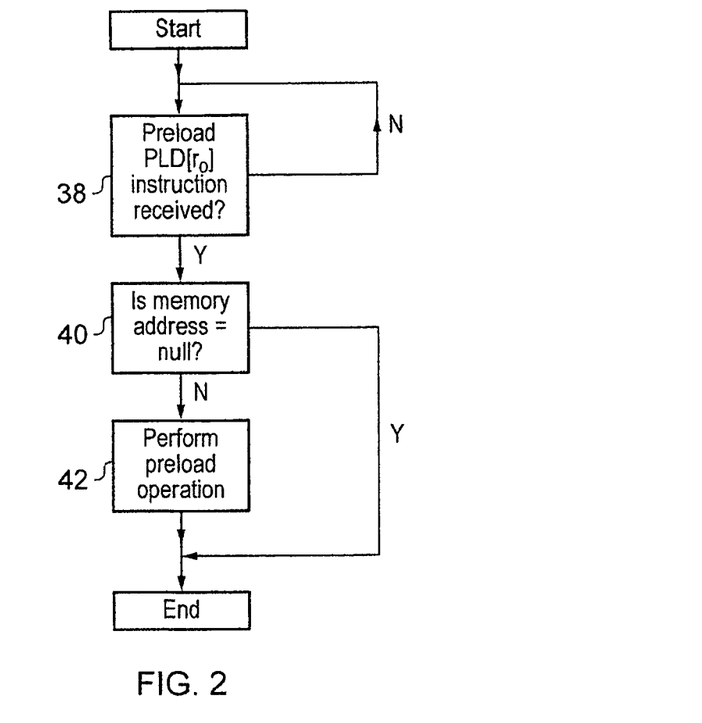
FIG. 2 is a flow diagram schematically illustrating decoding of a preload instruction by an instruction decoder.

FIG. 2 is a flow diagram schematically illustrating the decoding of a preload instruction PLD [$r_0$] as performed by the instruction decoder 32. At step 38 the processing waits until a preload instruction is received. When a preload instruction is received, then step 40 determines whether the memory address specified by the value stored within the register $r_0$ corresponds to the null value stored within the null value register 36. If there is a match, then the processing terminates. If there is not a match, then processing proceeds to step 42 where the preload operation is performed. The preload operation may include any necessary page table walk if the address translation data is not already stored within the translation lookaside buffer 20 and/or a cache line fetch operation to the cache memory 24.

Figure 3:
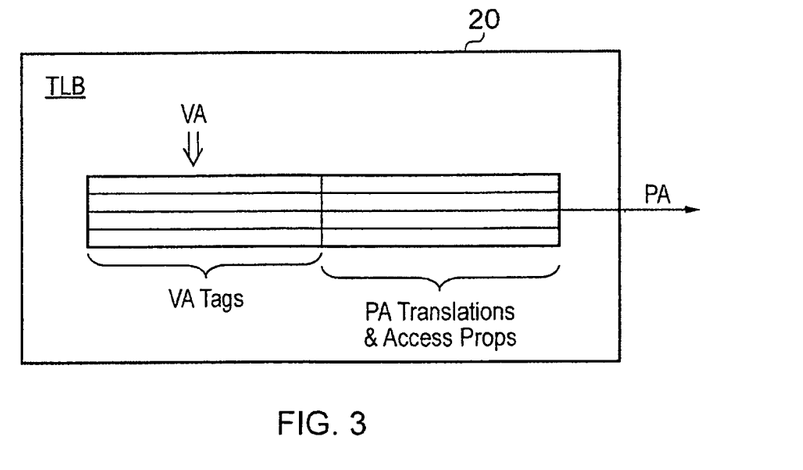
FIG. 3 schematically illustrates a translation lookaside buffer.

FIG. 3 schematically illustrates the translation lookaside buffer 20. The translation lookaside buffer 20 stores address mapping data in the form of virtual address tags with corresponding physical address translations and access properties. In use, a virtual address is used by the translation lookaside buffer 20 and a comparison is made with all of the virtual address tags stored within the address mapping data (e.g. the translation lookaside buffer is used as a content addressable memory CAM). If a match is found, then the corresponding physical translation is read from the address mapping data together with the access properties for that area of memory. It will be understood by those in this technical field that the pages into which the memory is divided have a size, such as 4 kB, such that only the most significant portion of the virtual address need be translated into a corresponding physical address. The bits within the address corresponding to the different positions within a memory page need not be translated.

Figure 4:
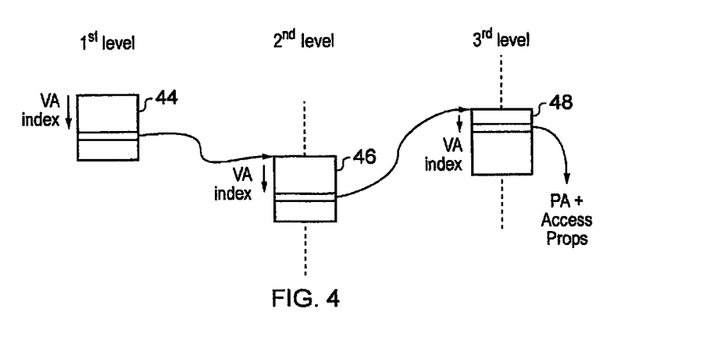
FIG. 4 schematically illustrates a page table walk through a three-level page table hierarchy.

FIG. 4 schematically illustrates a page table walk operation through the page table data 22 which occurs when there is a miss within the translation lookaside buffer 20. When a miss occurs, then the address mapping data for a received virtual address is not present within the translation lookaside buffer 20. Accordingly, a portion of the virtual address (e.g. a most significant portion) is first used to index into a first level table 44 where a pointer is found to a second level table 46. A different portion of the virtual address (e.g. a next most significant portion) is then used to form an index into a position within that second level table 46 from where a further pointer is read to identify a third level table 48. A final portion of the virtual address (but not all of the remainder of the virtual address) is consumed as an index an entry within the third level page table which stores the physical address translation data and the access properties to be returned to the translation lookaside buffer 20.

Figure 5:
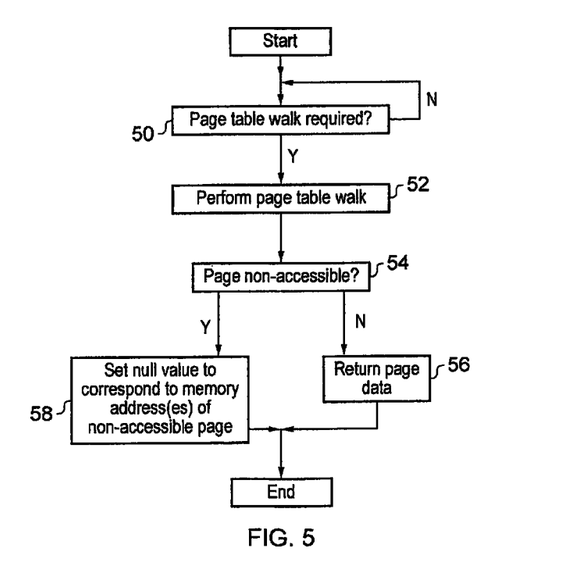
FIG. 5 is a flow diagram schematically illustrating updating of a null value for a preload instruction when a non-accessible page is encountered during a page table walk.

FIG. 5 is a flow diagram schematically illustrating how the null value may be set under hardware control by the memory management unit 18 in response to a page table walk accessing a non-accessible page. At step 50 processing by the memory management unit 18 waits until a page table walk is required. When a page table walk is required, then step 52 performs the page table walk as illustrated in FIG. 4 and returns the address mapping data including data indicating the access properties. Step 54 determines from the returned access properties whether or not the page is marked as non-accessible. If the page is not marked as non-accessible, then step 56 returns the page table data to the translation lookaside buffer 20. If the page is marked as non-accessible, then step 58 serves to set the null value within the preload null register 36 to correspond to the memory addresses of the page for which the page table walk has just been performed. This page table is non-accessible and accordingly there is no point in performing further page table walks to that non-accessible page. Thus, preload instructions specifying a memory address within that non-accessible page are subsequently identified as corresponding to the null value and a page table walk will not be triggered as part of a preload operation for such memory addresses.

Figure 6:
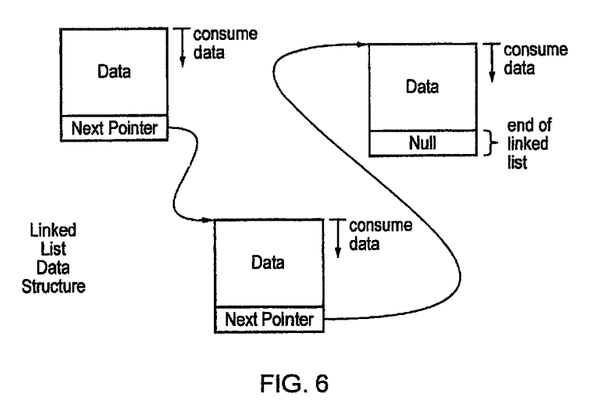
FIG. 6 schematically illustrates a linked list data structure using a null value to indicate the end of the linked list.

FIG. 6 is a diagram schematically illustrating a linked list data structure. Such linked list data structures are commonly used within data processing and are convenient for flexibly storing large volumes of data where the size of that data is not known in advance. The data is stored as data values to be consumed within fixed size blocks with the last entry in each block pointing towards the next block of data within that linked list data structure. Thus, a linked list may be formed of a variable number of blocks with each block pointing to the next block in the list. The final block in the list is indicated as being the final block by the presence of a null value in the position where the pointer to the next block is found. In order to increase processing efficiency, it is normal for the next pointer value to be used by a preload instruction when a data block is first opened. The preload operation thus performed in respect of the next block when the previous block is first accessed gives a sufficient time for operations such as cache loading, page table walks and the like to be performed before that next block of data is actually required to be present for consumption in the data processing. However, when the last block of data is encountered, it is a waste of energy and processing resources to perform a preload operation in respect of the null value stored as an indicator of the end of the linked list. Accordingly, the present technique permits such a null value to be identified and the preload operation suppressed.

Figure 7:
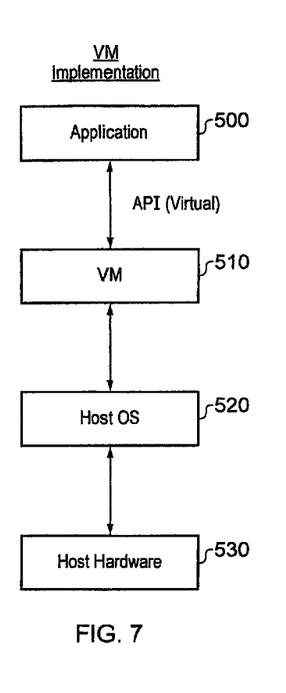
FIG. 7 schematically illustrates a virtual machine embodiment.

FIG. 7 illustrates a virtual machine implementation that may be used. Whilst the earlier described embodiments implement the present invention in terms of apparatus and methods for operating specific processing hardware supporting the techniques concerned, it is also possible to provide so-called virtual machine implementations of hardware devices. These virtual machine implementations run on a host processor 530 running a host operating system 520 supporting a virtual machine program 510. Typically, large powerful processors are required to provide virtual machine implementations which execute at a reasonable speed, but such an approach may be justified in certain circumstances, such as when there is a desire to run code native to another processor for compatibility or re-use reasons. The virtual machine program 510 provides an application program interface to an application program 500 which is the same as the application program interface which would be provided by the real hardware which is the device being modelled by the virtual machine program 510. Thus, the program instructions, including the control of memory accesses described above, may be executed from within the application program 500 using the virtual machine program 510 to model their interaction with the virtual machine hardware.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. Apparatus for processing data comprising:
   processing circuitry configured to perform data processing operations in response to program instructions;
   instruction decoder circuitry coupled to said processing circuitry and responsive to said program instructions to generate control signals for controlling said processing circuitry to perform said data processing operations; wherein
   said instruction decoder is responsive to a preload instruction, said preload instruction specifying a memory address location to be subject to a preload operation for preparing for a subsequent memory access to said memory address, to compare said memory address with a null value and:
   (i) if said memory address does not match said null value then to generate control signals for controlling said processing circuitry to perform said preload operation; and
   (ii) if said memory address does match said null value then not to generate said control signals for controlling said processing circuitry to perform said preload operation.

2. Apparatus as claimed in claim 1, comprising translation lookaside buffer circuitry configured to store address mapping data specifying translations between virtual addresses and physical addresses, wherein said memory address is a virtual memory address and said preload operation triggers loading of address mapping data for said memory address to said translation lookaside buffer if said address mapping data does not specify a translation for said memory address.

3. Apparatus as claimed in claim 2, wherein said address mapping data for said memory address is accessible using a page table walk operation.

4. Apparatus as claimed in claim 1, comprising a cache memory and wherein said preload operation loads data from said memory address to said cache memory.

5. Apparatus as claimed in claim 1, wherein said null value is zero.

6. Apparatus as claimed in claim 1, wherein said null value is one of a range of values.

7. Apparatus as claimed in claim 1, wherein said null value is a programmable value.

8. Apparatus as claimed in claim 6, wherein said null value is programmable by detecting circuitry configured to detect memory addresses that are not to be subject to said preload operation.

9. Apparatus as claimed in claim 1, wherein said memory address is within a memory address space divided into memory address pages and said instruction decoder circuitry is configured to set said null value to correspond to a previously detected memory access to a non-accessible memory page.

10. Apparatus for processing data comprising:
    processing means for performing data processing operations in response to program instructions;
    instruction decode for generating control signals in response to said program instructions, said control signals controlling said processing means to perform said data processing operations; wherein
    said instruction decode means is responsive to a preload instruction, said preload instruction specifying a memory address location to be subject to a preload operation for preparing for a subsequent memory access to said memory address, to compare said memory address with a null value and:
    (i) if said memory address does not match said null value then to generate control signals for controlling said processing means to perform said preload operation; and
    (ii) if said memory address does match said null value then not to generate said control signals for controlling said processing means to perform said preload operation.

11. A method of processing data comprising the steps of:
    performing data processing operations in response to program instructions;
    decoding program instructions to generate control signals for controlling said data processing operations; wherein
    said decoding is responsive to a preload instruction, said preload instruction specifying a memory address location to be subject to a preload operation for preparing for a subsequent memory access to said memory address, to compare said memory address with a null value and:
    (i) if said memory address does not match said null value then to generate control signals for controlling said data processing operations to perform said preload operation; and
    (ii) if said memory address does match said null value then not to generate said control signals for controlling said data processing operations to perform said preload operation.

12. A method as claimed in claim 11, further comprising storing address mapping data specifying translations between virtual addresses and physical addresses, wherein said memory address is a virtual memory address and said preload operation triggers loading of address mapping data for said memory address if said address mapping data does not specify a translation for said memory address.

13. A method as claimed in claim 12, wherein said address mapping data for said memory address is accessed using a page table walk operation.

14. A method as claimed in claim 11, wherein said preload operation loads data from said memory address to a cache memory.

15. A method as claimed in claim 11, wherein said null value is zero.

16. A method as claimed in claim 11, wherein said null value is one of a range of values.

17. A method as claimed in claim 11, wherein said null value is a programmable value.

18. A method as claimed in claim 17, wherein said null value is programmed by detecting hardware memory addresses that are not to be subject to said preload operation.

19. A method as claimed in claim 11, wherein said memory address is within a memory address space divided into memory address pages and said null value is set to correspond to a previously detected memory access to a non-accessible memory page.

* * * * *